United States Patent
Loewy et al.

[19]

[11] Patent Number: 6,045,753
[45] Date of Patent: Apr. 4, 2000

[54] DEPOSITED REAGENTS FOR CHEMICAL PROCESSES

[75] Inventors: Zvi Gerald Loewy, Fair Lawn; William Ronald Roach, Rocky Hill; Bawa Singh, Vorhees, all of N.J.

[73] Assignee: Sarnoff Corporation, Princeton, N.J.

[21] Appl. No.: 08/956,737

[22] Filed: Oct. 23, 1997

Related U.S. Application Data

[60] Provisional application No. 60/054,070, Jul. 29, 1997.

[51] Int. Cl.⁷ .................................................. G01N 33/48
[52] U.S. Cl. .............................. 422/57; 422/61; 422/102
[58] Field of Search .................................. 422/58, 61, 99, 422/101, 102

[56] References Cited

U.S. PATENT DOCUMENTS

| | | |
|---|---|---|
| 4,072,129 | 2/1978 | Bright et al. . |
| 4,088,093 | 5/1978 | Pan . |
| 4,160,257 | 7/1979 | Carrish . |
| 4,197,289 | 4/1980 | Sturzenegger et al. . |
| 4,332,789 | 6/1982 | Mlodozeniec . |
| 4,342,566 | 8/1982 | Theofilopoulos et al. ................ 422/61 |
| 4,349,531 | 9/1982 | Mlodozeniec et al. . |
| 4,538,163 | 8/1985 | Sheridon . |
| 4,685,620 | 8/1987 | Law et al. . |
| 4,779,564 | 10/1988 | Kiefer et al. . |
| 4,889,816 | 12/1989 | Davis et al. ............................ 422/99 |
| 4,917,978 | 4/1990 | Ritt et al. . |
| 4,918,468 | 4/1990 | Miekka et al. . |
| 4,921,727 | 5/1990 | Datta et al. . |
| 4,921,767 | 5/1990 | Datta et al. . |
| 4,956,150 | 9/1990 | Henry ..................................... 422/102 |
| 4,971,257 | 11/1990 | Birge . |
| 4,992,807 | 2/1991 | Thomson . |
| 5,014,076 | 5/1991 | Caley, Jr. et al. . |
| 5,027,136 | 6/1991 | Fotland . |
| 5,028,501 | 7/1991 | Ritt et al. . |
| 5,278,588 | 1/1994 | Kubelik . |
| 5,364,593 | 11/1994 | Mihaylov et al. ....................... 422/87 |
| 5,434,049 | 7/1995 | Okano et al. . |
| 5,464,588 | 11/1995 | Bather et al. ............................ 422/58 |
| 5,501,841 | 3/1996 | Lee et al. ............................... 422/101 |

FOREIGN PATENT DOCUMENTS

| | | |
|---|---|---|
| 59-150760 | 8/1984 | Japan . |
| 2 253 164 | 9/1992 | United Kingdom . |

OTHER PUBLICATIONS

Bate et al., *The Science of Powder Coatings*, vol. 2, pp. 69–71, (1994).

*Primary Examiner*—Lyle A. Alexander
*Attorney, Agent, or Firm*—William J. Burke

[57] ABSTRACT

Provided is a solid support having dry deposited thereon a first solid layer comprising at least a first compound, the compound for use in a chemical process conducted in a first solution. The invention allows stable forms where the first compound is not stable either (i) for storage in the first solution or (ii) in solution with one or more other compounds of the first layer. Also provided is a tray or kit of wells adapted for conducting a chemical process, each well having a deposited thereon a first solid layer comprising one or more compounds for supporting a chemical process conducted in a first solution, wherein addition of the first liquid to each of the wells dissolves said one or more compounds. Fabrication methods, time-release compositions, and methods of conducting chemical processes are further provided.

13 Claims, 2 Drawing Sheets

2

DEPOSITED REAGENTS FOR CHEMICAL PROCESSES

This application claims the benefit under 35 U.S.C. §119(e)(1) of provisional patent application Ser. No. 60/054,070, filed Jul. 29, 1997.

The present invention relates to methods of reliably and reproducibly depositing reagents for conducting a chemical process onto a solid support, where in certain embodiments the reagents can be arrayed in a patterned array on the solid support, and to solid supports thereby produced. Further provided are controlled release packets, which can be arrayed on a solid support, for delaying or controlling the time after exposure of the containers to a liquid that it takes for the contents of the packets to dissolve. The methods of the invention use electrostatics and electrical fields to produce the supports and controlled release packets.

In conducting a variety of clinical, forensic, environmental, research, quality control and other assays or chemical processes, it is often desirable to conduct a variety of parallel reactions or processes, for example to accommodate a number of experimental samples and to accommodate control reactions. Each of these reactions or chemical processes typically needs a setup of the same reagents. Those who have worked in a clinical or other science laboratory will recognize that one of the most labor-intensive chores involves setting up an assay. This chore is also one of the prime suspects for a source of variability in an assay. Recognizing this, Eastman-Kodak developed clinical analyzers that take setup reagents from films produced by emulsion technology similar to that used to manufacture photographic films. These analyzers are now marketed by Johnson & Johnson Clinical Diagnostics (Raritan, N.J. and Rochester, N.Y.) as the Vitros brand analyzers. Emulsion technology is complex in its execution, and cannot readily form films with reagents that are not sufficiently stable or soluble in the wet emulsions used to produce the films. Further, this technology is limited to applying reagents to films and is not well suited to applying reagents in a pattern at separate locations on a support.

The present invention provides solid supports on which reagents for chemical processes are applied with a high degree of accuracy and reproducibility using electrostatic or controlled field deposition. Those reagents that are unstable in a solution can be deposited (a) as a dry powder, (b) by use of a limited exposure to a wet toner vehicle, or (c) by selection of a wet toner vehicle in which the reagents are more stable. In any of these cases, the reagents are stored in a non-liquid ("dry") form layered on the solid support. These deposition processes allow two reagents which typically react or are otherwise incompatible with one another to be stored on the same support. For example, where the reagents do not have significant vapor pressures they can be deposited in the same layer while avoiding prolonged exposure to a reaction-promoting solution form. Alternatively, multiple layers which can include separating layers can be applied so as to minimize the exposure of the two reagents to one another.

Further provided are packets for reagents or other compounds, which reagents or other compounds are coated or admixed by controlled release layers. In one use, these reagents or other compounds can be released from the packets and into a liquid after other compounds have been dissolved. Thus, for example, a second antibody and detection reagents can be released only after time and reagents have been provided for supporting a binding reaction with a first antibody. Or in another example, reagents are delayed from dissolving into an assay until sufficient time has passed to allow experimental or control samples to be added to all of the reaction vessels.

SUMMARY OF THE INVENTION

In one embodiment, the invention provides a solid support having dry deposited thereon a first solid layer comprising at least a first compound, the compound for use in a chemical process conducted in a first solution. The invention allows stable forms where the first compound is not stable either (i) for storage in the first solution or (ii) in solution with one or more other compounds of the first layer.

In a second embodiment, the invention provides a tray or kit of wells adapted for conducting a chemical process, at least one well (and preferably two or more or all) has deposited thereon a first solid layer comprising one or more compounds for supporting a chemical process conducted in a first solution, wherein addition of the first liquid to each of the wells dissolves said one or more compounds.

The invention further provides a method of fabricating a solid support having deposited thereon a first solid layer comprising at least a first compound, the compound for use in a chemical process conducted in a first solution, comprising creating an electromagnetic force for attracting particles having a first charge to a surface of the solid support, and contacting the surface with the charged particles which comprise the material of the first layer.

The method can comprise: (1) in a first process, creating the electromagnetic force by directing ions of a second polarity opposite the first to the surface to create charges of the second polarity at the surface; or (2) in a second process, creating the electromagnetic force by generating an electrical field at a surface of the solid support. In these methods, the amount of material deposited can be monitored for instance by monitoring depositions onto a sensing electrode or monitoring the optical density or fluorescence or the deposited material, and when a target amount of deposition has occurred removing the electric field or removing non-adherent charged particles.

In a further embodiment, the invention provides a solid support having deposited thereon a first compound and a time-release composition, wherein upon exposure of the solid support to a first liquid in which the first compound is soluble the dissolution of the first compound is delayed by the presence of the time-release layer. A layer of material added over the time-release composition can include a second compound that is dissolved more quickly than the first compound.

In still another embodiment, the invention provides a method of conducting a chemical process in wells of a tray, wherein one or more of the wells is designated to receive a sample which can be dissolved in the first liquid, the method comprising (i) providing the wells, which have deposited therein a time-release composition that comprises delayed-release reaction reagents that are soluble in the first liquid, (ii) adding first liquid to all of the wells, and (iii) adding, for example concurrently with step (ii) or thereafter, sample to the designated wells such that each designated well receives sample prior to a designated time period after addition of the first liquid to the well, wherein the time-release composition assures that the delayed-release reaction reagents are substantially delayed from dissolving in the first liquid until after the designated time period.

Alternatively, the method can comprise (a) providing the wells, wherein the time-release composition comprises reaction reagents that are soluble in the first liquid, and wherein the surface is further coated with a layer comprising early-release reaction reagents that are soluble in the first liquid, and (b) adding first liquid to all of the wells and adding to sample to the designated wells, wherein the time-release composition assures conditions for a first reaction process are first supported by a dissolution of the early-release reaction reagents and subsequently a dissolution of the delayed-release reaction reagents assures conditions for a second reaction process.

In another embodiment, the invention provides a solid support comprising on a surface hereof a non-overlapping pattern of first solid layers each comprising a first compound for use in a chemical process conducted in a solution or in vapor phase.

DEFINITIONS

Figure 1:
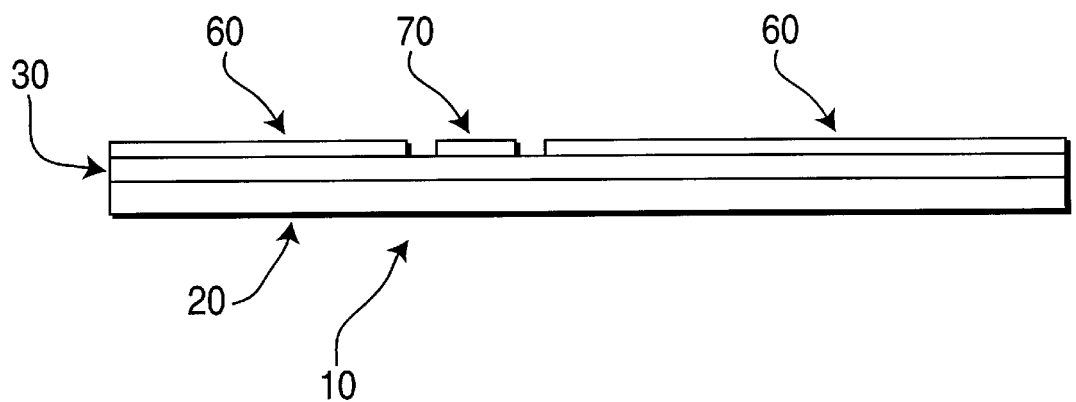
FIG. 1 displays a floating electrode apparatus.

The following terms shall have, for the purposes of this application, the meaning set forth below. In particular, for the purpose of interpreting the claims, the term definitions shall control over any assertion of a contrary meaning based on other text found herein:

Attached

By "attached," "attachment," "attaching" and related words, the Applicants refer to bonding or adsorption of a compound to a surface of a solid support of sufficient strength so that a liquid-solid phase chemical process can be conducted at the surface with the premise that compound will remain bonded to the solid support, or at least that sufficient amounts of the compound will remain bonded so as not to undermine the intent of the process. For example, a chemical process may be premised on the surface-bonded compound not being extracted into a contacting liquid, since for example the surface-bonded compound would not be favorably present during later liquid-phase steps of the process; however, the degree to which extraction into the contacting liquid is detrimental will depend on the particular process. Similarly, a chemical process may be premised on having sufficient amounts of the surface-bonded compound remaining available to play a role in generating a surface-associated detection signal. In a preferred embodiment, at least about 10% of the of the compound remains bonded to the surface after the chemical process, more preferably at least about 20% remains bonded, still more preferably at least about 50% remains bonded, yet still more preferably at least about 80% remains bonded, and still yet more preferably at least about 95% remains bonded. In a particularly preferred embodiment, in excess of about 99% of the surface-bonded compound remains bonded after the chemical process.

Dry Deposited

A material is "dry deposited" if deposited without applying the material in a liquid vehicle.

Nomenclature for Covalently Attached Compounds

Where a compound is to be attached to a solid support by a covalent bond, this bond necessarily implies that the compound which is initially deposited and that which is eventually attached to the support are not, in a strict chemical sense, the same. However, for the purposes of this application the deposited compound and the derivative formed in covalently attaching to the solid support are sufficiently the same, particularly where the property of the compound of interest is maintained in the support-attached form.

Nucleic Acid

The nucleic acid sequences used in the invention are preferably deoxyribonucleic acid sequences. However, they can also be ribonucleic acid sequences, or nucleic acid analogs, meaning compounds designed to preserve the hydrogen bonding and base-pairing properties of nucleic acid, but which differ from natural nucleic acid in, for example, susceptibility to nucleases.

Substantially Delayed

"Substantially delayed" from dissolving in the second liquid means delayed sufficiently so that, so long as the sample is added to a given well (reaction vessel) prior to a designated time period, a time-sensitive assay can be conducted based on the time that the first liquid was added to the well rather than the time at which the sample was added.

DETAILED DESCRIPTION OF THE INVENTION

Chemical, biochemical and molecular biological reactions require the addition of many reagent components. These reagents can include enzymes, buffering agents, salts, organic and inorganic compounds and macromolecules. Formulation of an optimized mixture of such reagents can be challenging when the reagents are presented in liquid form. Many reagents are not compatible at the required concentrations. Moreover, stability of the mixture as well as storage requirements impose additional challenges.

Currently, assay users are required to aliquot reagents from stock solutions of reagents into a number assay vials. This process is laborious or requires expensive automation equipment, and is subject to error.

1. Electrostatic and Controlled Field Deposition

In electrostatic deposition methods a substrate is sufficiently electrically isolated so that an electrostatic charge can be accumulated on the substrate. One means of accumulating the charge is by taking advantage of the photoelectric effect. In this method the substrate is exposed to electromagnetic radiation effective to strip charges, typically electrons, from the surface of the substrate. Other methods include tribocharging, plasma treatment, induction charging and corona charging. In a more preferred method, an ion emitter is oriented towards the surface on which one intends to create a charge and operated. Such methods of ion printing to controllably electrostatically deposit charged materials such as powders are described in detail in U.S. application Ser. Nos. 08/471,889 (filed Jun. 6, 1995), 08/659,501 (filed Jun. 6, 1996) and 08/733,525 (filed Oct. 18, 1996), which documents are incorporated by reference herein in their entirety.

It should be noted that where the average charge-to-mass ratio of the charged particles of the deposition material is known, the mass of particles that will effectively deposit can be relatively accurately predicted from the amount of charge previously accumulated on the substrate. In particular, for a given type of substrate a calibration database can be compiled. For a given average charge-to-mass ratio of the applied particles, the relationship of accumulated charge to deposited mass can be calibrated for a given set of materials and charging conditions. In a production protocol, the average charge-to-mass ratio of the particles can be monitored, for instance using the velocimeter and a modified quartz crystal monitor described in U.S. application Ser. Nos. 08/661,211 and 08/661,210, both filed Jun. 10, 1996, which documents are incorporated herein by reference in their entirety. The illustrative charge-to-mass monitor functions by applying a voltage to a crystal such as a quartz crystal to establish a vibratory frequency, monitoring changes in the vibratory frequency when exposed to the charged particles, and correlating these changes to the mass of the particles that impact the monitor. Another charge-to-mass monitor uses the cage blowoff method of C. B. Schein and J. Cranch, *J. Applied Phys.* 46: 5140, 1975. With the use of one or more charge-to-mass monitors, feedback loops can be incorporated into the electrical controls of a deposition apparatus. In one preferred embodiment, a charge-to-mass monitor is positioned so as to sample the charge-to-mass of particles at their source (examples for source devices described below) and a charge monitor (for example a device for measuring currents created by the deposition of charged particles) is positioned adjacent to the site of deposition. The sampling values produced at these two sites provide diagnostic data on the operation of the deposition apparatus.

A number of additional methods can be used to monitor the amount of material that is deposited on a solid support. For example, optical methods can include measuring reflectance, transmission, or fluorescence using laser or non-collimated light of broad or narrow band width. Other sources of directed electromagnetic energy can be used, for instance X-ray absorption or fluorescence or microwave absorption can be used. A tuned circuit can be used to monitor an endpoint at which deposited material creates a resonance with an energy source such as a microwave energy source. Acoustic absorption can also be used, where preferably the sound source is an ultrasound source. Another exemplary measuring method can use a profilameter, which is a laser device that measures the amount the a beam of light is deflected by a surface with deposited material to measure the depth of the deposited material. Further electrical methods can include measuring a capacitance between a conductive material associated with the solid support (for example a conductive material incorporated into the solid support or a conductive material that has the solid support positioned adjacent to it) and another conductor, where the deposited material is located between the two conductors.

A variety of additional factors can be monitored or controlled to increase the reproducibility of the charge-to-mass ratios generated by the charged deposition material source. For example, controlling the humidity of the local environment, the nature and content of bound solvent in the materials sought to be deposited, the purity of materials sought to be deposited, and the rubbing velocity effected in the tribocharging process can be important.

Another method of attracting charged deposition materials to a surface has been termed "controlled field deposition," and typically involves applying a potential to an electrode which directly or indirectly results in the formation of an attractive electrical field at the surface upon which charged material will be deposited. For example, a substrate can have electrical conductors positioned below the deposition surfaces, and a potential applied to the conductors results in the formation of an attractive field at the surface. Where the separation between the substrate's surface and the conductors is sufficiently small, once an external potential is no longer applied to the conductors the charge of the deposition material results in a charge redistribution in the conductors such that an electrostatic "image" force is formed between the deposition material and the conductors, thereby helping to stabilize the deposition material's adherence to the surface.

Further examples of field-generating means include the use of "floating electrodes." A floating electrode is an electrode which develops a localized field as a result of charge redistributions in the floating electrode, which are for example generated by voltages applied across one or more adjacent bias electrodes. Thus, for example, as illustrated in FIG. 1, a floating electrode apparatus 10 can have a backing electrode 20, a non-conductive layer 30, a shielding electrode 60 and a floating electrode 70. In the illustrative floating electrode, a bias potential applied across the backing electrode and the shielding electrode (which two electrodes serve as the bias electrodes) causes a charge redistribution in the floating electrode to created the charged-particle attracting field at the floating electrode. Further description of floating electrodes and other forms of field generating devices for controlled field deposition can be found in U.S. application Ser. No. 08/661,210, filed Jun. 10, 1996, which documents is incorporated herein by reference in its entirety. An advantage of floating electrode devices is that the amount of charged particles that will effectively adhere as a result of the field generated at the floating electrode depends on the size of the bias potential. (For more direct field generating apparatuses, the deposition can in principle continue for as long as a potential is applied.)

The field generating devices for controlled field deposition can be designed (a) to directly apply deposition material onto apparatuses that incorporate electrodes for generating the field or (b) for use with electrostatic chucks (i.e., field application structures) which operate in conjunction with the substrate on which deposition material is to be applied. In the former case (a), it is generally desirable that the metallization processes used to create the electrodes is susceptible to mass production techniques. For example, the metallization can be created by lithographic techniques where finely patterned electrodes are sought or by adhering or fusing metal layers to the substrate. In design (b), the electrostatic chuck is generally effective to electrostatically adhere the substrate to the chuck. This adherence of the substrate to the chuck does not depend on the application of any process for creating a charge on the substrate, but instead is believed to be the result of a redistribution of charges in the substrate in response to the field generated by the electrostatic chuck. Of course, a charge on the substrate can usefully be employed to strengthen electrostatic adherence. A third option is that the substrate is designed to reversibly couple with a device that provides the electrodes, such that the substrate and the coupled device provide a field-generating apparatus. In this way, the electrode structures that can be a source of manufacturing costs remain separate from the consumable on which reagents for conducting a chemical process will be deposited. In addition to the documents recited above, further information on electrode structures and electrostatic chucks can be found in U.S. application Ser. No. 08/630, 012, filed Apr. 9, 1996, which document is incorporated herein by reference in its entirety.

The charge of the particles applied to a substrate can be generated for example by plasma treatment, radiation treatment (including treatment with suitably high energy electromagnetic radiation) or ion bombardment. More preferably, however, the charge is generated by tribocharging, wherein two materials with differing triboelectric constants rub against each other and transfer charge between one another. Tribocharging is more preferred over the enumerated charge-producing methods because it exposes the particles to the least amount of reaction-promoting energy, and hence the tribocharging method is less susceptible to causing compounds to degrade. Examples of materials that can be used for tribocharging include polytetrafluoroethylene ("TEFLON"), and polymers of chlorotrifluorethylene, chlorinated propylene, vinyl chloride, chlorinated ether, 4-chlorostyrene, 4-chloro-4-methoxystyrene, sulfone, epichlorhydrin, styrene, ethylene, carbonate, ethylene vinyl acetate, methyl methacrylate, vinyl acetate, vinyl butyral, 2-vinyl pyridine styrene, nylon and ethylene oxide. See, for example, "Triboelectrification of Polymers" in K. C. Frisch and A. Patsis, *Electrical Properties of Polymers* (Technomic Publications, Westport, Conn.), which article is hereby incorporated by reference in its entirety. For example, polytetrafluoroethylene and polyethylene and other negatively charged materials will generally create a positive charge on an object. Nylon and other positively charged materials will generally create a negative charge on an object. Tribocharging and appliances for dispensing charged particles are describe in U.S. application Ser. Nos. 08/659,501 (filed Jun. 6, 1996) and 08/661,211 (filed Jun. 10, 1996). U.S. application Ser. No. 08/661,211 describes, in particular, an acoustic dispenser that uses vibratory energy and gating electric fields to dispense charged particles for deposition onto the substrate, and is incorporated herein by reference in its entirety.

In some embodiments, the charged particles may be made up of a wet toner wherein particles of liquid material or liquid material with suspended solids are charged. Charging of the liquid particles can be by, for example, tribocharging occurring at the time the particles are formed, utilizing contact potential differences between solid particles and the particles, or modifying the differences in electrical potential using surface treatments such as surfactants. (See, L. B. Schein, *Electrophotography and Development Physics*, Laplacian Press, 1996, p. 227.) Often it is favorable to dry deposit materials to avoid issues of solubility and stability of a chemical. On the other hand, however, liquid phase depositions are often practical, especially where cautionary procedures, such as limiting the time of exposure to the liquid phase and selecting appropriate carrier solvents, are employed. Liquid phase distribution is for example useful where a material to be deposited is not readily converted to a dry form that can be deposited, or where the non-deposited dry form does not retain an activity such as a biological activity.

2. Patterned Depositions and Removal of Excess Particles

Figure 2:
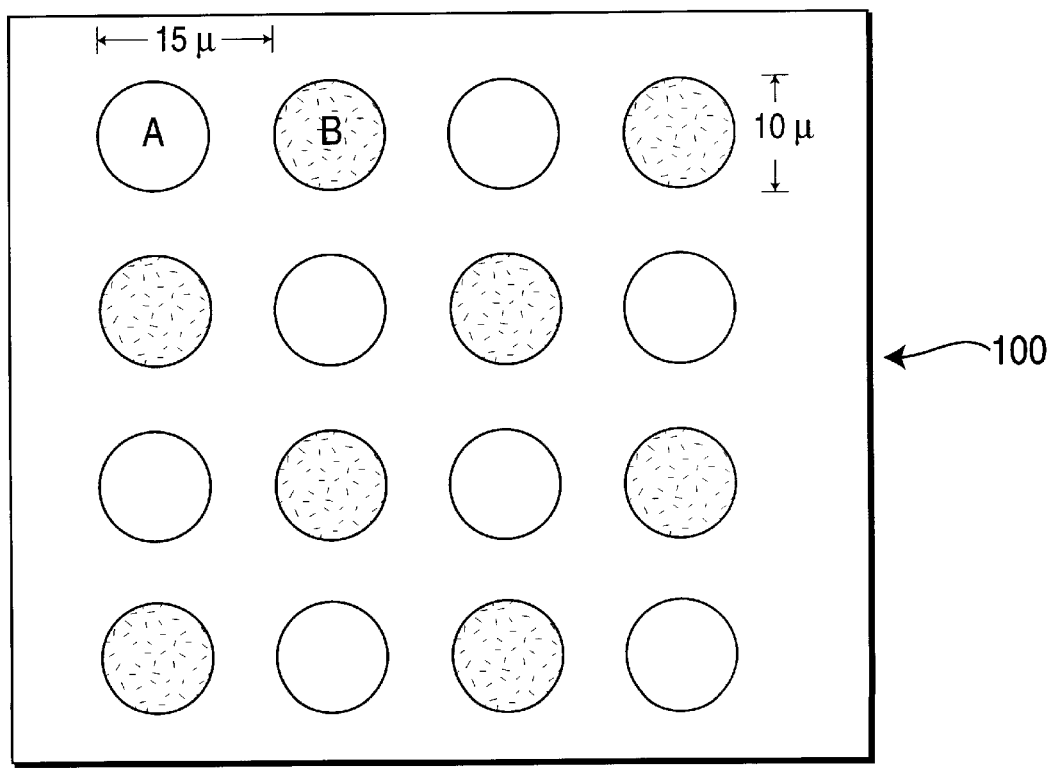
FIG. 2 shows a patterned deposition of material A and a material B.

Electrostatic or controlled field deposition methods can be used to apply patterns of materials on a substrate. For example, a pattern of an deposited material A and a deposited material B can be formed on a substrate 100 as illustrated in FIG. 2. In some embodiments of the invention, the deposition pattern can be highly dense, such as three hundred, six hundred or more dots per square inch (dpi). In preferred embodiments, the separation between the depositions is at least about 5 $\mu$m and the width of the depositions is at least about 10 $\mu$m.

After the deposition process, it is in some embodiments desirable to remove nonadherent particles. This removal process can be particularly important in embodiments where two separate patterns of deposition material are applied to a substrate, since remnants of a material A could possibly be found at the locations where a subsequent deposition of material B is anticipated. Methods to remove such nonadherent "background" particles can include rinsing (such as gentle rinsing with a sufficiently nonconductive and nonsolubilizing solvent), blowing (such as gentle blowing with an inert gas), shaking, or application of an electronic brush. An electronic brush is any device that is or can be calibrated and positioned to apply an electronic field that applies a force on particles, where the field and resulting force can be manipulated mechanically or electrically to displace nonadherent charged particles.

Referring again to FIG. 2, suppose for example that the substrate 100 was conditioned to have a negative charge at the "A" sites by ion printing. After positively charged particles of A material are applied, those particles that are do not adhere are removed. Ion printing can then be applied to condition the "B" sites and apply the appropriate charged particles of B material. As discussed further below, additional layers can be applied to the substrate which can contain inert substances (inert to the use to which the substrate will be put), and these additional layers often can be applied without the need for patterned deposition or can be applied with reduced need for precise metering of the deposition amount. Accordingly, these layers often can be applied by methods other than electrostatic or controlled field deposition. For example, after the A material is deposited, the substrate is coated with layer of material to form an isolating layer, and thereafter the top layer of isolating material is conditioned by ion printing to receive the B material.

3. Avoiding Unacceptable Levels of Adsorption to the Substrate

Where depositions are made directly on a substrate material (which for example is not soluble in a liquid to which the substrate will later be exposed), at least an amount of the deposited material can be expected to be attached to the substrate material. This effect will very with the degree to which the substrate material tends to attach to substances found in the deposited material. In many instances the amount of attached material will be small compared with the amount of material that can later be dissolved during the course of a chemical process, and the percentage amount attached will be sufficiently reproducible so that the practical effect on the subsequent chemical process is negligible. However, these adsorption effects can be further minimized by coating the substrate with a soluble material, and then applying the deposition material over this initial coating.

In two other applications, filed concurrently with the parent hereof and concurrently herewith, Applicants describe the use of electrostatic and controlled field deposition to create defined amounts of attached materials. See, copending patent application Docket No. SAR 12487, entitled "Solid Support With Attached Compounds," Loewy et al., which is incorporated herein by reference in its entirety. In certain embodiments, it is desirable to have certain compounds attached to the substrate, and other compounds, which may be present in an overlaid coating, applied in a form that can be solubilized. For example, each well in a reaction tray can have attached to its bottom surface a macromolecule involved in an assay (such as an antibody, other receptor molecule, or a nucleic acid probe). A cocktail of the reagents needed for at least the first step of an assay involving the macromolecule can also be applied to a surface of the well, so that the addition of a solubilizing liquid provides a substantial beginning for the assay.

4. Supports, Vessels and Well Trays

Supports can be solids having a degree of rigidity such as glass, porcelain, silicon, plastic, and the like. Support can also be flexible materials such as plastic or otherwise synthetic materials, materials of natural polymers or derivatives thereof (such as cellulose or silk), and the like. In certain embodiments the support is a porous material which can be rigid or flexible, such as sintered glass, intermeshed fibers including woven fabrics, and the like. In some embodiments, the solid support is a bead or pellet, which can be porous. In one embodiment where the support is a porous material the material of the support between depositions is fused. In this way, the substrate is porous at the portions where depositions have been made, but non-porous at intervening locations. The substrate thus has defined channels for allowing fluid flow through the substrate.

Figure 3A:
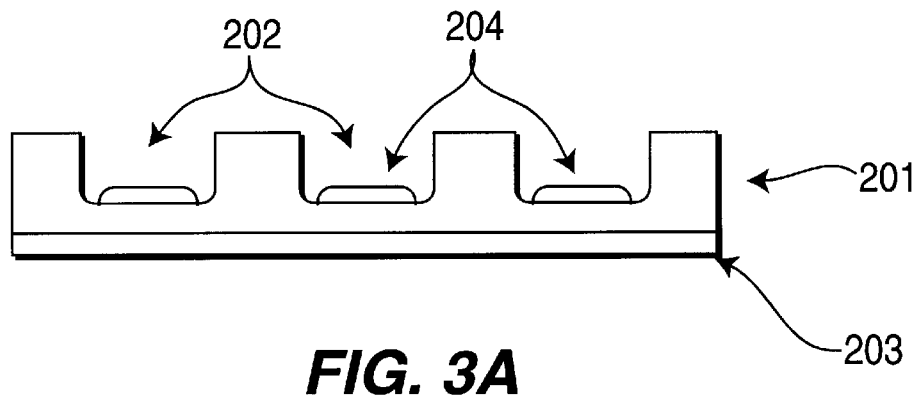
FIGS. 3A and 3B show a tray of wells in which materials have been deposited.
Figure 3B:
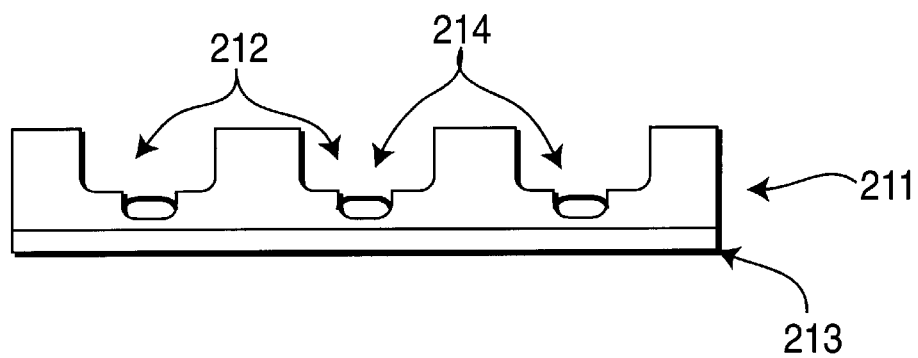

The substrate on which reagents are deposited can form part of a vessel in which a chemical process is to be conducted. In particular, the substrate can be a tray of wells such as is formed by molding processes of plastic or is created by etching or laser drilling techniques in a variety of materials (as described, for example, in U.S. application Ser. No. 08/630,018, filed Apr. 9, 1996, which document is incorporated herein by reference in its entirety). Such vessels can have associated conductive layers which can form the electrodes used in controlled field deposition (where the conductive layer can for example couple with electrical leads for providing electrical potentials) or provide a conductive layer supporting an image force to help retain charged particles. For example, FIGS. 3A and 3B illustrate substrates 201 and 211, which include wells 202 and wells 212, respectively. Deposited in the wells 202 and 212, are deposits 204 and 214, respectively. In FIG. 3B, the deposits 214 are found in indentations (not numbered) found at the bottom of wells 212. Underneath the wells 202 and 212 are conductive layers 203 and 213, respectively, which conductive layers can support an image force for retaining charged particles. The deposits 214 are made up of two layers, as indicated by a difference in shading.

In one embodiment of the invention, the support reagents are added to the site at which the chemical process will occur in the form of a pellet or other carrier that is added at the site of the chemical process. For example, a pellet is added to each of a number of vessels, and liquid and sample materials are added to initiate the reaction process. In this case, the initial substrate on which the reagents are deposited is selected so that such pellets (or other carriers) can be built therefrom after the deposition process. Thus, for example, the initial substrate can be a tablet or a capsule (into which materials can be deposited). Alternatively, the initial substrate can be a sheet of material that can be cut into pellets or other carriers.

5. Alternative Methods of Applying Coatings

Additional layers can be applied to the substrate without electrostatic or controlled field deposition techniques. For example, coating materials, which can be dry or more preferably dissolved or suspended in a volatile carrier, are applied by spraying, brushing, dipping or the like. For dry powder depositions it will often prove desirable to mechanically scrap the top of the applied material assure that a uniform thickness of material has been applied. The coating material may for example contain a low melting point polymer such as a polyethylene glycol which is fused with moderate heat to more strongly bond the applied layer of coating material to the substrate. Alternatively, sheets of material are applied for example using an intermediate adhesive or, where the materials are suitable, fusion bonding. Fusion bonding techniques include heat fusion, ultrasonic fusion, laser fusion, pressure bonding, and the like.

In some embodiments, the additional layers dissolve in the liquid of the anticipated subsequent chemical process.

6. Controlled Release

As an aspect of the invention, a reagent can be deposited such that its release does not occur until after a time delay or until after a change of conditions, such as a pH change, has occurred. In one form of the invention, the controlled release operates to delay the operative phase of a chemical process until all of the sites at which the process is to be conducted in parallel have been fully formulated. For example, liquid can be added to all of the sites, and then at least a subset of sites receives material from unknown samples or control samples. In one case, the simple addition of the liquid initiates a window time during which to add all of the unknown or control material, after which time window various reagents that support the chemical process are released into the liquid. Alternatively, a simple triggering event like a change of pH could begin the release of the process-supporting reagents. Also, multiple layers of materials can be used so that, for example, a first deposited layer provides reagents that support a first chemical process, and thereafter another deposited layer releases reagents that support a second chemical process. Such layered release layers can provide for two, three, or more phases of a chemical process.

Substantial development has been made, particularly with reference to pharmaceuticals, in the field of controlled release or sustained release compositions. These compositions tend to be made up of mixtures of polymers with varying swelling properties and various excipients. Some of these compositions are designed with a focus on minimizing swelling in an acidic environment such as that of the human stomach, while allowing faster swelling in an alkali environment, such as that of the small intestines. Particularly for veterinary applications, the pH dependence of the swelling profile can be reversed to favor swelling, and thereby dissolution of the active components of the composition, in acidic environments.

Examples of controlled release technology can be found in: (1) U.S. Pat. No. 4,012,498, "Sustained Release Formulations," Kornblum et al., Sandoz, Inc. (contains alkaloids incorporated into a basic pH affected controlled release matrix selected from cellulose acetate phthalate, polyvinyl acetate phthalate and hydroxy propylmethyl cellulose phthalate); (2) U.S. Pat. No. 4,111,202, "Osmotic System for the Controlled and Delivery of Agent Over Time," Feliz, Alza Corp.; (3) U.S. Pat. No. 4,173,626, "Sustained Release Indomethacin," Dempski et al., Merck & Co., Inc. (coats pellets with polyvinyl acetate to slow release); (4) U.S. Pat. No. 4,178,361 "Sustained Release Pharmaceutical Composition," Cohen et al., Union Corp. (uses a water-soluble but water swellable matrix which holds a biological binding agent); (5) U.S. Pat. No. 4,221,778, "Prolonged Release Pharmaceutical Preparations," Raghunathan, Pennwalt Corp. (ion exchange resin particles with drug absorbed thereon which are treated with an impregnating agent [polyethylene glycol, propylene glycol, mannitol, lactose and methylcellulose] to slow swelling in water and coated with a diffusion barrier); (6) U.S. Pat. No. 4,248,857, "Sustained Release Pharmaceutical Compositions," DeNeale et al., American Home Products Corp.; (7) U.S. Pat. No. 4,252,786, "Controlled Release Tablet," Weiss et al., E. R. Squib & Sons, Inc. (medicament compressed with a blend of polymeric vinyl pyrrolidone and a caroxyvinyl hydrophilic polymer and coated with a substantially water insoluble, but water permeable film); (8) U.S. Pat. No. 4,259,314, "Method and Composition for the Preparation of Controlled Long-Acting Pharmaceuticals," Lowey; (9) U.S. Pat. No. 4,293,539, "Controlled Release Formulations and Method of Treatment," Ludwig et al., Eli Lilly and Company (active dispersed in a copolymer of glycolic acid and lactic acid); (10) U.S. Pat. No. 4,309,404, "Sustained Release Pharmaceutical Compositions," DeNeale et al., American Home Products, Corp.; (11) U.S. Pat. No. 4,309,405, "Sustained Release Pharmaceutical Compositions," Guley et al., American Home Products, Corp.; (12) U.S. Pat. No. 4,505,890, "Controlled Release Formulation and Method," Jain et al., E. R. Squib & Sons, Inc. (a coated core containing a hydrocolloid gelling agent [methyl cellulose, hydroxypropyl cellulose, hydroxy ethyl cellulose, sodium carboxymethyl cellulose or mixtures thereof]; (13) U.S. Pat. No. 4,587,118, "Dry Sustained Release Theophylline Oral Formulation," Hsiao, Key Pharmaceuticals, Inc., (seed coated with theophylline and polyvinylpyrrolidone, then coated with a mixture of ethylcellulose and hydroxypropylcellulose); (14) U.S. Pat. No. 4,666,705, "Controlled Release Formulation," DeCrosta et al., E. R. Squib & Sons, Inc.; (15) U.S. Pat. No. 4,716,041, "Diffusion Coated Multiple-Units Dosage Form," Kjornaes et al., A/S Alfred Benzon (formulation is heated to form, in an film coating located inside an outer film layer, a continuous phase); (16) U.S. Pat. No. 4,784,858, "Controlled Release Tablet," Ventouras, Zyma SA (core contains water soluble agent, a water-insoluble polymeric excipient [e.g. polyvinylchloride or polymer of lower alky acrylates or methacrylates], and a water-insoluble substance that swells on contacting water, and core is coated with a elastic, water-insoluble, semipermeable diffusion coating); (17) U.S. Pat. No. 4,917,900, "Controlled Release Formulations Containing Zidovudine," Jones et al., Burroughs Wellcome Co. (coated with a mixture of a polymer of alkyl esters of acrylic or methacrylate and ethyl cellulose); (18) U.S. Pat. No. 4,973,469, "Drug Delivery System," Mulligan et al., Elan Corp., PLC (active ingredient and an inert substance whose aqueous solubility is inversely proportional to that of the active are adsobed to a cross-linked polymer such as cross-linked polyvinylpyrrolidone, carboxymethylcellulose or methylcellulose); (19) U.S. Pat. No. 5,178,868, "Dosage Form," Malmqvist-Granlund et al., Kabi Pharmacia Aktiebolaq (cores coated with a mixture of (a) a copolymer of vinyl chloride/vinyl acetate/vinyl alcohol monomers and (b), for creating pores, a substance that is soluble in water); (20) U.S. Pat. No. 5,234,691, "Sustained-Release Preparation of Basic Medicinal Agent Hydrochloride," Uemura et al., Sumitomo Pharmaceuticals, Co., Ltd. (granules containing basic agent and a polyanion such a carboxyvinyl polymer or carboxymethcellulose and coated with a slightly water-soluble macromolecular substance such as polyvinyl acetate, ethyl cellulose, aminoalkylmethacrylate copolymer, methacrylic acid copolymer, cellulose acetates, polyethylene, polymethyl methacrylate, polydimethyl-siloxane, hardened oil, beeswax, carnauba wax, sucrose fatty acid ester, sorbitan monostearate, glyceryl monostearate, glyceryl monomyristate, glyceryl distearate, stearic acid, stearyl alcohol, and mixtures thereof); (21) U.S. Pat. No. 5,286,493, "Stabilized Controlled Release Formulations Having Acrylic Polymer Coating," Oshlack et al., Euroceltique, S.A. ((a) coating a substrate with a plasticized aqueous dispersion of ammonio methacrylate copolymers which are copolymerizates of acrylic and methacrylic esters, having a low content of quaternary ammonium groups acrylic and methacrylic acid esters, having a permeability which is unaffected by the pH conditions prevailing in the gastrointestinal tract, and (b) curing the coated substrate with a temperature greater than the glass transition temperature of the aqueous dispersion); (22) U.S. Pat. No. 5,472,712, "Controlled-Release Formulations Coated with Aqueous Dispersions of Ethylcellulose," Oshlack et al., Euroceltique, S.A.; (23) U.S. Pat. No. 5,492,700, "Process and Composition for the Development of Controlled Release Gemfibrozil Dosage Form," Ghebre-Sellassie et al., Warner-Lambert Co. (a single granulation of gemfibrozil particles granulated with a release-control agent such as of cellulose phthalate, ethyl cellulose, polyvinyl phthalate, cellulose succinate, cellulose buryrate, poly (meth)acrylic acid, partially esterified poly(meth)acrylic acid and mixtures thereof); (24) U.S. Pat. No. 5,580,578, "Controlled Release Formulations Coated with Aqueous Dispersions of Acrylic Polymers" Oshlack et al., Euroceltique, S. A.; (25) U.S. Pat. No. 5,643,602, "Oral Composition for the Treatment of Inflammatory Bowel," Ulmius, Astra Aktiebolag (a seed with a first coating of film-forming, water-soluble or insoluble polymers and a second coating of a membrane containing a pharmaceutically acceptable, film-forming, anionic carboxylic polymer which is difficult to dissolve at a low pH but is soluble at a higher pH of about 4 to 7.5); (26) U.S. Pat. No. 5,656,295, "Controlled Release Oxycodone Compositions," Oshlack et al., Euroceltique, S.A, and (27) Ishikawa et al., *Chem. Pharm. Bull.* 43: 2215–20, 1995 (describing polybenzylmethacrylate copolymer having a cross-linkable part on the side chain for use as an outer layer in a controlled-release formulation, which copolymer is crosslinked for example by contacting an oxygen plasma).

One focus of controlled release technology is in coating or mixing compounds of interest with compositions that swell a given type of liquid at a predictable rate. This technology relies substantially on the swelling properties of polymers. Where one seeks to reduce the swelling rate in acidic aqueous environments, often the polymers used include acid functional groups that titrate between a low solubility acid form and a higher solubility salt form. Where one seeks to reduce the swelling rate in basic aqueous environments, often the polymers used include base functional groups that titrate between a low solubility base form and a higher solubility salt form. It should be noted that the excipients or fillers can play a role in modulating the rate at which the controlled release composition swells.

Additionally, the components of a controlled release formulation which will have an active role in a subsequent chemical process can affect the dissolution profile, as will be recognized by those of ordinary skill. The effects of these "actives" on the swelling profile can generally be expected to be greater if admixed with the controlled release composition rather than deposited under a layer of controlled release composition.

The pH sensitivity of certain controlled release compositions can be utilized in designing protocols for chemical processes. For example, if a first process is to occur at a low pH and a subsequent process at a higher pH, the reagents that support the second process can be sequestered by a controlled release composition that is more resistant to swelling in an acidic environment.

Figure 4:
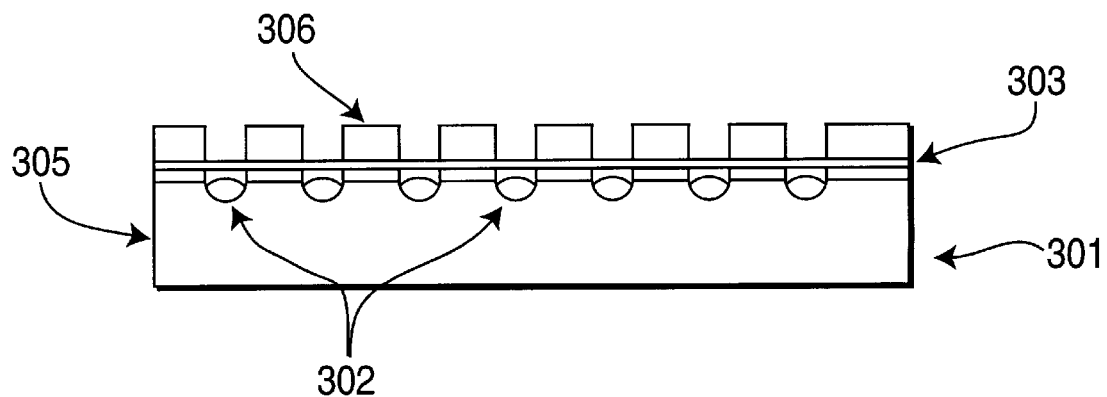
FIG. 4 shows a substrate with controlled release features.

Another mechanism for controlling release is to provide a kinetic/diffusion barrier to substrate deposited chemicals passing into a liquid. For example, FIG. 4 illustrates a substrate 301 in which materials have been deposited in cavities 302, which in turn is covered by a membrane 303. The substrate is made up of a lower portion 305, to which is fused an upper portion 306. The upper portion defines wells above the locations of the cavities. This diffusion control mechanism can of course be combined with the rate-of-swelling mechanism discussed above. As alluded to above in the recitation of published examples of controlled release formulations, the diffusion control can be formed as polymer-containing films overlying an interior composition.

7. Methods and Substrates for Handling Incompatible Reagents

In many cases reagents that are used together in a chemical process are not stable if stored together, especially in solution. This lack of stability (at least in the long term) is often attenuated when reagents are stored in a solid form such that opportunities for the reagents to collide are minimized. By the present invention, the reagents can be deposited by a dry deposition method or, if liquids are used in the deposition process, the time during which the reagents are solubilized or suspended in the liquids can be kept to a minimum. Using the intermediary layers described above, and even intervening layers of controlled release compositions, the incompatible reagents can be further separated. By simply depositing the reagents in separate deposition steps, the exposure of the reagents to one another is reduced even where the incompatible reagents are deposited in adjacent layers.

Reagents can be incompatible in the sense that one is favorably processed in a liquid in which a second reagent is insoluble or unstable. This contingency can be addressed by the present invention by having the reagents both applied by a dry deposition method, or by having the second reagent applied by a dry deposition method.

8. Preferred Chemical Processes

One example in which controlled release is used is in processes that require several enzyme catalyzed reactions. The product of one enzyme reaction serves as substrate for a different enzyme used in a second process step. Each enzyme has differing requirements relating for example to salts, buffers, cofactors, temperature and the like. For example, an nucleic acid amplification (such as a polymerase chain reaction) can be initiated by the enzyme reverse transcriptase, which has certain requirements of pH, salts, temperature and the like. After the initial reverse transcriptase reaction, a DNA polymerase can be used, which polymerase enzyme has different requirements than the reverse transcriptase. Moreover, during the subsequent DNA polymerase-mediated operations it is desirable to assure that the reverse transcriptase is no longer functioning under sub-optimum conditions, so the controlled release formulation can be designed to release reverse transcriptase inhibitors.

Nucleic acid amplification methods include without limitation (1) Polymerase chain reaction (PCR; see, e.g., U.S. Pat. No. 4,683,202 and *Short Protocols In Molecular-Biology* (Frederick M. Ausubel et al., eds. 1992)(hereinafter, Ausubel et al.), Unit 15.1); (2) ligase chain reaction (LCR; see, e.g., European Patent Publication 320,308 and Schachter et al., *J. Clin. Microbiol.*, 32, 2540–2543 (1994)); (3) strand displacement amplification (SDA; see, e.g., Walker et al., *PCR Methods and Applications*, 3, 1–6 (1993)); (4) nucleic acid sequence-based amplification (NASBA; see, e.g., van Gemen et al., *J. Virol. Methods*, 43, 177–188 (1993)); and (5) transcription-mediated amplification (TMA; Pfyffer et al., *J. Clin. Micro.*, 34, 834–841 (1996)). For example, there can be three nucleic acid segments (the segment of double-stranded DNA to be amplified and two single-stranded oligonucleotide primers flanking this segment), a porotein component (a DNA polymerase), appropriate dNTPs, a buffer and salts. The procedures for these amplification methods are described for example in the above-cited documents, and this description of methodology is incorporated by reference in the present disclosure. Further description of amplification methodology is found in Myers and Sigua, "Amplification of RNA: High Temperature Reverse Transcription and DNA Amplification with Thermus Thermophilus DNA," in *PCR Strategies*, Academic Press, 1995, which document is incorporated herein by reference in its entirety.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. A solid support having dry deposited thereon two or more separated regions of a first solid layer comprising at least a nonvolatile compound, the nonvolatile compound for use in a chemical process conducted in a first solution wherein the first layers are deposited by electrostatic or controlled field deposition.

2. The solid support of claim 1, wherein the nonvolatile compound is a macromolecule.

3. The solid support of claim 1, wherein the nonvolatile compound is not stable either (i) for storage in the first solution or (ii) in solution with one or more other compounds deposited on the solid support so as to participate with the nonvolatile compounds in the chemical process.

4. The solid support of claim 3, wherein the nonvolatile compound is a macromolecule.

5. The solid support of claim 1, wherein each of two or more separated regions of first solid layer comprises a distinct non-volatile compound.

6. The solid support of claim 5, wherein the nonvolatile compound is a macromolecule.

7. A tray of wells adapted for conducting a chemical process, a plurality of the wells having dry deposited thereon a first solid layer comprising one or more nonvolatile compounds for supporting a chemical process conducted in a first solution, wherein addition of the first liquid to each of the wells dissolves said one or more nonvolatile compounds wherein the first layers are deposited by electrostatic or controlled field deposition.

8. The tray of wells of claim 7, wherein the first layers comprise, in an amount adapted for use in a nucleic acid amplification method (i) a DNA polymerase or a reverse transcriptase and (ii) a oligonucleotide primer.

9. The tray of claim 7, wherein one or more of the nonvolatile compounds is a macromolecule.

10. A solid support comprising on a surface thereof a non-overlapping pattern of dry deposited first solid layers each comprising a first nonvolatile compound for use in a chemical process conducted in a solution phase wherein the first layers are deposited by electrostatic or controlled field deposition.

11. The solid support of claim 10, wherein the first nonvolatile compound is a macromolecule.

12. The solid support of claim 10, further comprising on the surface a non-overlapping pattern of dry deposited second layers each comprising a second nonvolatile compound for use in a chemical process conducted in a solution.

13. The solid support of claim 12, wherein the second nonvolatile compound is a macromolecule.

* * * * *